Nov. 11, 1941.   K. E. PRICE   2,261,942
TWINE FASTENING MEANS FOR TOBACCO HANGER STICKS
Filed May 2, 1940
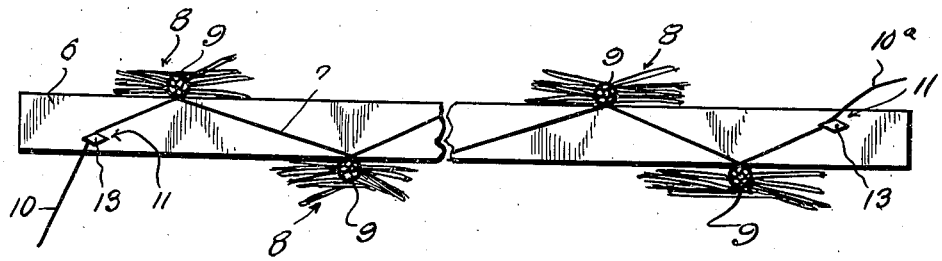
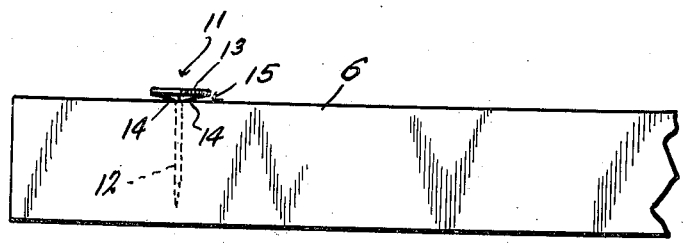
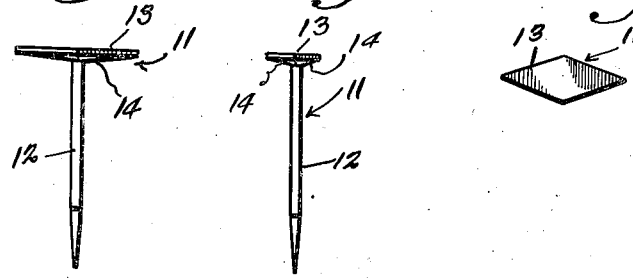
Inventor
*Kenneth E. Price*
By *Clarence A. O'Brien*
Attorney Patented Nov. 11, 1941

2,261,942

UNITED STATES PATENT OFFICE 2,261,942

TWINE FASTENING MEANS FOR TOBACCO HANGER STICKS

Kenneth E. Price, Grifton, N. C.

Application May 2, 1940, Serial No. 333,026

1 Claim. (Cl. 24—127)

The present invention relates broadly to hanger sticks such as are utilized in the tobacco industry for purposes of attaching and suspending therefrom so-called hands of tobacco, but has more specific reference to resultfully convenient and expedient means especially designed to facilitate anchoring and retention of the opposite free ends of the tobacco leaf attaching and suspending twine or the like.

I am fully conversant with known prior art and various modes of handling tobacco leaves during the period of preliminary drying and conditioning for ultimate curing, special preparation, and marketing purposes. At the present time it is quite customary for a worker in the field to haphazardly loop and tie one end of the twine to the adjacent or corresponding end of the stick to provide for anchorage of such end. Then by looping the twine around the stalks, the hands of tobacco are alternately hung in somewhat staggered relation from opposite longitudinal edges of the wooden hanger stick. Finally, the opposite or remaining free end of the twine is looped around the remaining end of the stick in what has proved to be a somewhat unreliable and time consuming fashion. This method of securing the ends of the twine to the stick is not only laborious and tedious, but gives rise to a waste of time and involves needless expense.

In my years of experience in this line of endeavor, I have also obtained knowledge of other unsatisfactory ways and means of accomplishing desired twine-end anchoring results. I have learned, for instance, that one now abolished method employed the principle of forming kerfs at opposite ends of the stick, the cuts or kerfs being made by a penknife or the like, and the ends of the twine being frictionally lodged and held therein. But, the fragile wood ordinarily employed for tobacco hanger sticks soon made this temporarily useful method obsolete. It has come to my attention too, that another method employed in the field consisted in forming a transverse hole at one end of the stick, the twine being passed therethrough and a knot tied in the end to secure the twine or cord at the starting point. Then at the opposite end of the stick there was used a horizontal kerf or notch designed to permit the free end of the twine to be lodged therein.

Other methods than these have been employed but, so far as I am aware, the practices in vogue have all proved unsatisfactory for one reason or another. Confronted with this constant source of annoyance, I have recently discovered the need for a more reliable and adequate means and method of twine handling.

In carrying into effect the principles of the instant invention, I have found it expedient and practicable to utilize simple headed fasteners on the top surface of the stick at opposite ends thereof. In so doing, I now offer this unique contribution, believing that it meets the demands of the trade and is aptly fitted for the purposes intended in that time, labor and expense is saved.

Other features and advantages will become more readily apparent from the following description and the accompanying drawing.

In the drawing, wherein like numerals are employed to designate like parts throughout the views—

Figure 1 is a top plan view showing a conventional tobacco hangar bar or stick and illustrating the method and means forming the novelty of the instant invention.

Figure 2 is an enlarged fragmentary view of one end of the stick showing the headed fastener in place and the twine and tobacco plants omitted for clearness and emphasis of illustration.

Figures 3, 4 and 5 are detail elevational views of the fastener per se, this constituting the essence of the present invention.

Referring to the drawing by distinguishing reference numerals, and particularly to Figure 1, the conventional longitudinally elongated rectangular wooden stick or bar is denoted by the numeral 6. Ordinary twine 7 is employed in tying and suspending the tobacco hands 8 from opposite sides of the stick in the manner disclosed. In practice, the twine is looped or otherwise suitably wrapped around the stems as indicated at the points 9. Obviously, I attach no novelty to this phase of the method or procedure. In fact, it is evident that the novelty has to do with the means and procedure of securing or anchoring the opposite free ends 10 and 11 to the corresponding ends of the stick 6. Identical fasteners are employed and each fastener is denoted by the numeral 11. As shown, it comprises a pointed shank 12 which may be described as a nail. This is driven into the top of the stick inward of the adjacent end of said stick. It will be observed, however, that the head 13 of the so-called nail is diamond-shaped in outline or configuration. Moreover, the under face of the head is thickened to provide pyramidal bevels 14. These in turn define, in conjunction with the stick, V-shaped pockets 15 into which the adjacent end of the twine is lodged. It is obviously important that the bevels are necessary to facilitate riding of the convolutions or coils of the twine into the V-shaped seats or pockets suitable for firm lodgment thereof. It is important too, to note that the diamond shape provides oppositely pointing V-shaped tips to facilitate guiding or feeding of the cord into place. Experience shows that with this particular construction, only a few seconds need be required in winding and satisfactorily anchoring the twine-ends.

To facilitate an understanding of my claims, I desire to emphasize and focus attention on the precise construction and sloping formation of the underside of the head, particularly at the juncture thereof with the shank. That is to say, the stated inner or undersurface of the head is of a predetermined and graduated thickness and the beveling is in correct proportion to the companion parts as well as the surface of the stick. In accomplishing this, the bevels are inwardly from the marginal edge and the slope gradual and such as to define a stop shoulder at the immediate juncture of the point of greatest thickness with the shank. Thus fashioned, the shoulder checks the inward "drive" of the shank and forms limited V-shaped spaces or pockets in which the windings of the twine become lodged and firmly and conveniently bound in place. It follows therefore that these functional features of carefully planned design lend themselves admirably well to the particular purpose for which they were especially intended.

The construction and method employed is so evident and simple as to be substantially self-explanatory. Hence, a more elaborate statement of the construction and mode of use seems unnecessary.

While the preferred embodiment of the invention has been shown and described, it is to be understood that minor changes coming within the field of invention claimed may be resorted to if desired.

I claim:

As a new article of manufacture, a twine anchoring element for use in conjunction with tobacco hand hanger sticks comprising a pointed shank adapted to be driven into the stick and a head formed integral with one end of the shank, said head being diamond-shaped in outline, flat on its top, and its underside having beveled surfaces extending in slight incline from the marginal edges of the head to the shank to form acute V-shaped retention pockets in which the wrapped twine is adapted to be wedged and securely lodged.

KENNETH E. PRICE.